(12) United States Patent
Strahm et al.

(10) Patent No.: US 7,683,258 B2
(45) Date of Patent: Mar. 23, 2010

(54) WIRE HARNESS THAT PREVENTS WATER INGRESS

(75) Inventors: Jack Strahm, Marysville, OH (US); Ryuji Umehara, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/972,751

(22) Filed: Jan. 11, 2008

(65) Prior Publication Data
US 2009/0178846 A1 Jul. 16, 2009

(51) Int. Cl.
H02G 3/04 (2006.01)

(52) U.S. Cl. .................. 174/72 A; 174/68.1; 174/68.2; 174/71 C; 174/135; 174/95; 439/207; 52/220.1

(58) Field of Classification Search ............... 174/68.1, 174/68.3, 72 A, 72 C, 135, 95, 97, 101, 481, 174/96; 52/220.1, 220.5; 439/207, 211
See application file for complete search history.

(56) References Cited

U.S. PATENT DOCUMENTS

| | | | |
|---|---|---|---|
| 4,697,720 A | 10/1987 | Hotchkiss et al. | |
| 4,864,082 A * | 9/1989 | Ono et al. | ..................... 174/97 |
| 4,940,419 A | 7/1990 | Kuritz et al. | |
| 4,997,394 A | 3/1991 | Katz et al. | |
| 5,086,195 A * | 2/1992 | Claisse | ..................... 174/101 |
| 5,703,325 A | 12/1997 | Yamaguchi et al. | |
| 6,023,022 A * | 2/2000 | Nakamura et al. | ........ 174/88 R |
| 6,108,202 A | 8/2000 | Sumida | |
| 6,172,300 B1 | 1/2001 | Kawaguchi | |
| 6,448,497 B1 * | 9/2002 | McCracken et al. | ........... 174/97 |
| 6,518,500 B1 * | 2/2003 | Huang | ..................... 174/50 |
| 6,528,728 B1 * | 3/2003 | Shima | ..................... 174/101 |
| 6,545,217 B2 | 4/2003 | Sato | |
| 6,677,526 B2 * | 1/2004 | Kishizawa | ............... 174/68.1 |
| 6,713,674 B2 * | 3/2004 | Chang | ..................... 174/50 |
| 6,743,981 B2 | 6/2004 | Miyakoshi | |
| 6,768,054 B2 | 7/2004 | Sato | |
| 6,784,365 B2 * | 8/2004 | Ohashi et al. | ................ 174/50 |
| 6,992,248 B1 * | 1/2006 | Dunbar et al. | ................ 174/50 |
| 7,060,893 B1 * | 6/2006 | Villi | ..................... 174/507 |
| 7,470,861 B1 * | 12/2008 | Ross et al. | ................... 174/95 |
| 7,513,790 B2 * | 4/2009 | Keeven et al. | ............... 439/369 |

* cited by examiner

*Primary Examiner*—Dhiru R Patel
(74) *Attorney, Agent, or Firm*—Jason H. Foster; Kremblas Foster Intellectual Property

(57) ABSTRACT

A wire harness for preventing water from contacting capped, connected electrical wires. A lid and a base define an interior chamber. The base has fingers extending vertically upwardly for holding wire caps and connected electrical wires therein. A shelf protrudes from the inner surface of each finger to provide a platform for the bottom edge of the wire cap to seat against, securing the wire cap against downward movement. The sidewalls of the lid extend a predetermined distance below the shelves of the fingers to form a rim that creates a double air trap within the harness for preventing water from contacting the conductive portions of the wires.

9 Claims, 2 Drawing Sheets

WIRE HARNESS THAT PREVENTS WATER INGRESS

CROSS-REFERENCES TO RELATED APPLICATIONS (Not Applicable)

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

1. Field of the Invention

This invention relates generally to wire harnesses and more particularly to a protective wire harness enclosure for preventing electrical wires from coming into contact with water.

2. Description of the Related Art

Conventional wire harnesses are routinely implemented in a variety of electrical systems, such as those employed in motor vehicles. Such harnesses are used for the convenient assembly and organization of a collection of interconnected electrical wires, as well as for protecting those wires from potentially harmful conditions that may exist outside the harness, such as flooding.

Despite the use of a conventional harness, the exposed connective sections of wires within a harness remain susceptible to water contact due to harness structural failures such as leakage or breakage. This is highly undesirable, as exposure of live electrical wires to water may cause overcurrent conditions that may disrupt or damage an electrical system.

BRIEF SUMMARY OF THE INVENTION

It is an object and feature of the present invention to provide a wire harness that not only secures and shields the interconnected electrical wires disposed therein, but that has an improved interior configuration that provides a double air trap for preventing water-to-wire contact.

In accordance with the present invention, there is provided a harness having a lid and a base defining a chamber. The lid has a top wall and an upper enclosure, and the upper enclosure has a ceiling and four adjoining side walls that define an upper chamber. The four side walls extend vertically downwardly from the ceiling, passing through and extending below the top wall, terminating at a bottom rim. The rim defines an opening that is part of a contiguous empty space extending from below the top wall into the upper chamber.

One or more fingers extend vertically upwardly from the base into the upper chamber. Each finger has a channel within it for holding a vertically oriented wire cap and a set of at least two interconnected electrical wires. The connective ends of the wires (i.e. the unsheathed portions of the conductors) are engaged by the wire cap. Furthermore, a shelf protrudes into the channel from the inner wall of each finger, and extends upwardly from the base. The top of the shelf provides an upwardly facing platform for the lower edge of the wire cap to seat against.

The platform created by each shelf, and therefore the bottom edge of each wire cap that is seated on a shelf, is disposed within the harness above the bottom rim. This configuration provides two air traps within the harness, one within the upper chamber and one within each wire cap. These traps prevent any water that may enter the harness from rising above the lower edges of the air traps, thereby preventing water from contacting the connective portions of the wires therein.

Figure 1:
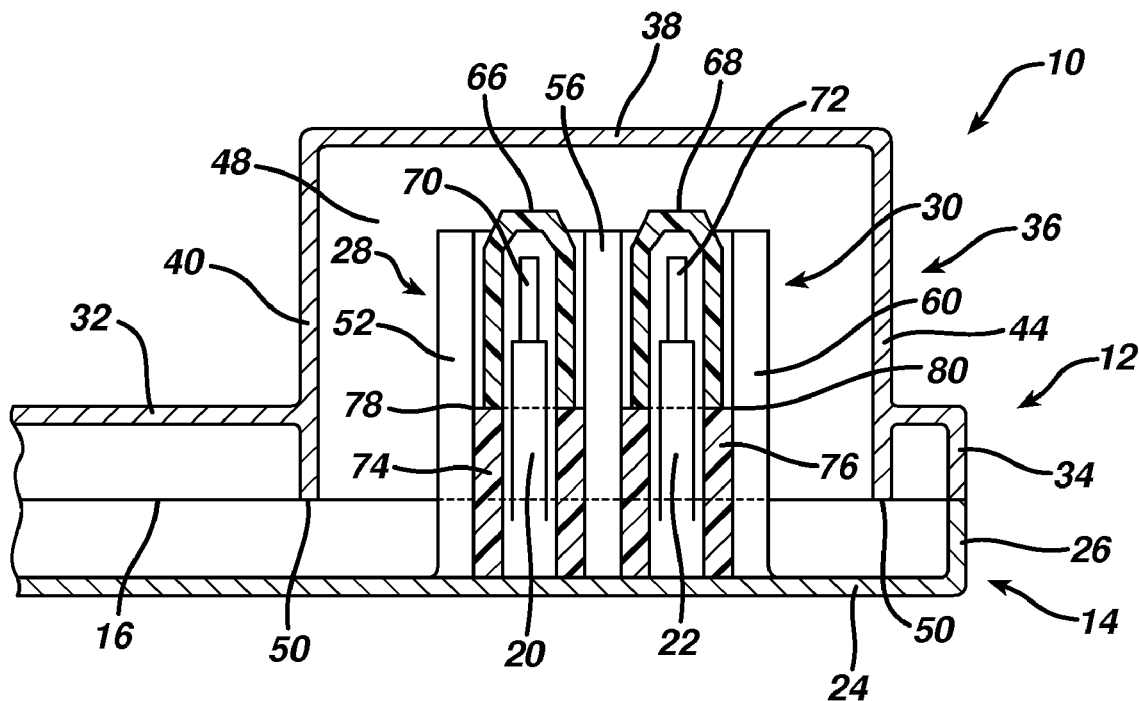
FIG. 1 is a side cross-sectional view illustrating the preferred embodiment of the present invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or term similar thereto are often used. They are not limited to direct connection, but include connection through other elements where such connection is recognized as being equivalent by those skilled in the art.

DETAILED DESCRIPTION OF THE INVENTION

Figure 2:
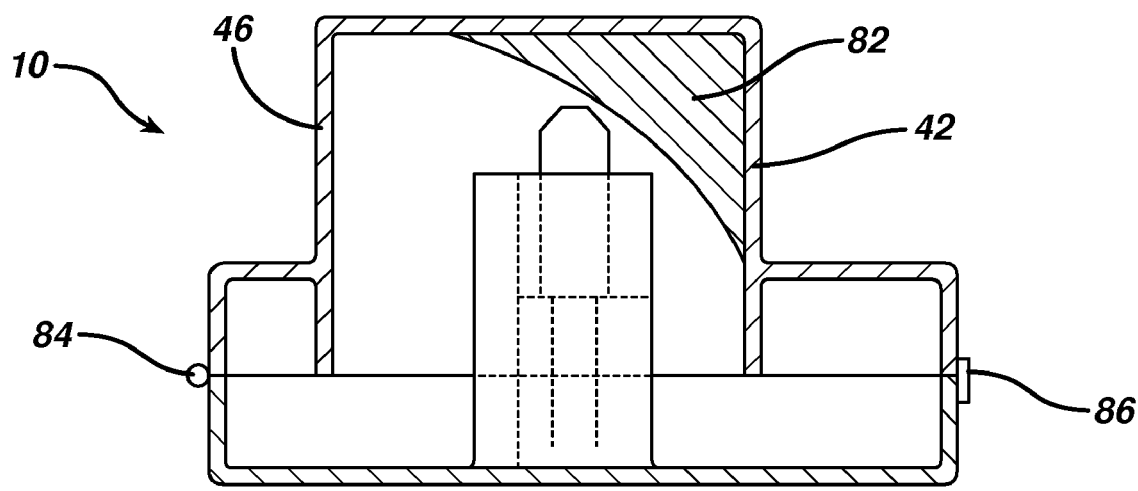
FIG. 2 is a front cross-sectional view illustrating the preferred embodiment of the present invention.
Figure 3:
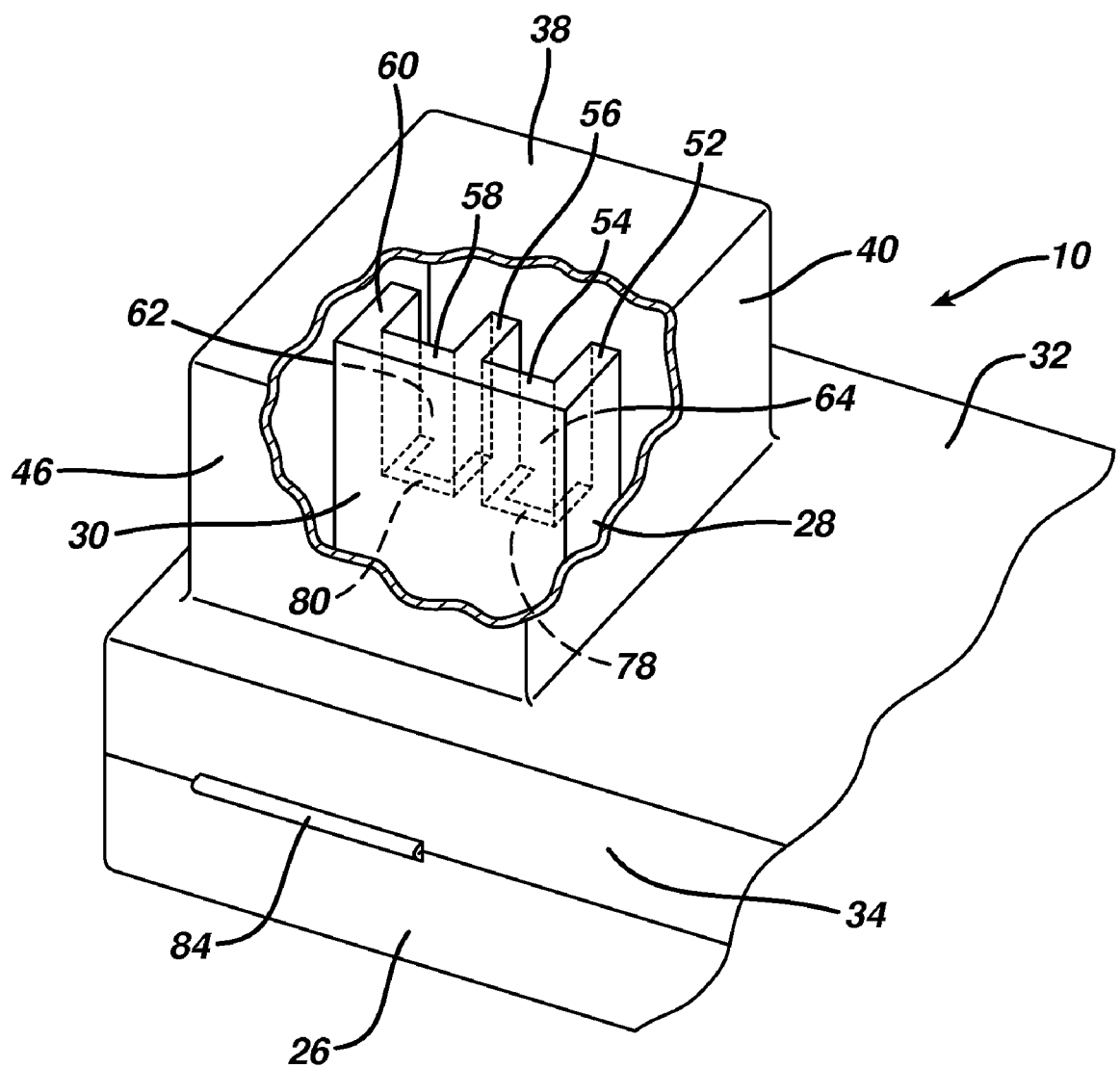
FIG. 3 is a perspective view illustrating the preferred embodiment of the present invention with a cut-out view of the upper enclosure portion.

As shown in FIGS. 1-3, the harness 10 has a lid 12 and a base 14 which fit securely together to close the harness 10. This forms a watertight seal at the lid-base juncture 16 for preventing water from entering the harness 10.

The lid 12 of the harness is a unitary body having a top wall 32, an upper lip 34, and an upper enclosure 36. The upper enclosure 36 has a rectangular ceiling 38 and four sidewalls 40, 42, 44, and 46 extending downwardly and attached to each other at adjoining edges defining an upper chamber 48. Other shapes can be substituted for the preferred shape. The ceiling 38 is parallel to the top wall 32. Each of the sidewalls 40-46 extends vertically downwardly from a respective edge of the ceiling 38, passing through and extending below the top wall 32 of the lid 12 and terminating at a bottom rim 50. The bottom rim 50 is positioned approximately halfway between the top wall 32 and a floor 24 as discussed below, although this distance is not critical so long as there is at least enough space left between the bottom rim 50 and the floor 24 for wire to pass through. The bottom rim 50 defines an opening that is part of a contiguous empty space extending from below the top wall 32 into the upper chamber 48. Wire can pass through this empty space.

The base 14 of the harness 10 is a unitary body having a floor 24, a lower lip 26, and two fingers 28 and 30. The fingers 28 and 30 are formed from adjoining finger walls 52, 54, 56, 58, and 60. One of the walls 56 is shared by both fingers 28 and 30. The finger walls 52-60 extend vertically upwardly from the floor 24, past the bottom rim 50 and into the upper chamber 48, terminating at a point close to the ceiling 38. The finger walls 52-60 form channels 62 and 64, each of which holds one of the vertically oriented wire caps 66 and 68 and at least two electrical wire pairs 20 and 22 with conventional sheathing covering conductor pairs 70 and 72. The wire pairs 20 and 22 are a pair of separate conductors that have been joined together, and are given one reference number per pair.

The interconnected conductor pairs 70 and 72 are disposed within, and are securely engaged by, their respective wire caps 66 and 68.

Depending upon the application, there can be as few as one finger or as many fingers as are deemed necessary to implement a particular design. Each finger can have more than three sidewalls. Furthermore, the fingers 28 and 30 may comprise one unitary body, sharing a wall as depicted in FIGS. 1 and 3, or the walls may be separate from each other. Thus, it will become apparent that many alternatives to the preferred fingers 28 and 30 are contemplated.

The shelves 74 and 76 extend upwardly from the base 14 and protrude from the inner wall of each of the fingers 28 and 30 into the respective channels 62 and 64, providing upwardly facing platforms 78 and 80, respectively, for the lower edges of the wire caps 66 and 68 to seat against. The shelves 74 and 76 extend to a height that is determined by the wire cap height and the height of the ceiling 38. When the lower edges of the wire caps 66 and 68 are seated on the shelves 74 and 76, the top or closed ends of the wire caps 66 and 68 protrude above the tops of the fingers 28 and 30 to, or just beneath, the ceiling.

A primary air trap is created within the upper chamber 48. Therefore, if water enters the harness 10, causing the water level inside the harness 10 to rise from the floor 24 upward to the bottom rim 50, the air occupying the space inside the upper chamber 48 will have nowhere to escape to. The air will therefore continue to occupy the space inside the upper chamber 48, despite increased pressure, and will prevent water from entering the upper chamber 48. The air trap keeps the conductor pairs 70 and 72 inside the upper chamber 48 dry. The upper chamber 48 thus acts in the same manner as a diving bell, keeping water from entering a downwardly facing cavity filled with air.

It is a critical feature of the harness 10 that the shelves 74 and 76, and therefore the bottom edges of the wire caps 66 and 68 seated on the shelves 74 and 76, be disposed within the harness 10 above the bottom rim 50. In the event that water should somehow enter the upper chamber 48, each wire cap 66 and 68 forms a secondary air trap. If water rises above the bottom rim 50 and reaches the lower edges of the wire caps 66 and 68, the air inside the wire caps 66 and 68, unable to exit the top closed ends of the wire caps 66 and 68, will have nowhere to escape. The air will therefore continue to occupy the space inside the wire caps 66 and 68, despite increased pressure, and will prevent water from entering the wire caps 66 and 68 from the bottom open ends. The air trap will thereby prevent water from contacting the conductor pairs 70 and 72 therein. It should be noted that although a double air trap configuration has been described, embodiments of the invention employing three or more air traps are also contemplated. For example, another chamber having another rim can be formed within the upper chamber 48.

FIG. 2 shows a structure that can be added to the invention, in which a flange 82 is employed to help secure the seated wire caps 66 and 68 against vertical and horizontal movement. The flange 82 has a concave surface and extends from the ceiling 38 to a sidewall 42. When the harness 10 is closed, the flange 82 fits snugly against the tops of the wire caps 66 and 68, applying vertical and horizontal pressure to them to firmly seat them against the platforms 78 and 80, thereby preventing them from shifting within their respective channels 62 and 64. Flanges having other shapes and, more generally, any other methods for securing the wire caps against movement within their respective channels, are also contemplated by this invention.

In a typical application, the harness 10 is mounted within the engine compartment of a motor vehicle, such as an automobile or a watercraft. However, the harness 10 may be employed in any application in which it is desirable to reduce the risk of water to wire contact. The harness 10 may be made from any rigid, watertight material, but is preferably constructed from a plastic such as acrylonitrile butadiene styrene (ABS) using conventional manufacturing methods such as injection molding. The dimensions of the harness 10 will vary from application to application based on design constraints such as the space available for the harness 10 and the number of wires that must be accommodated by the harness 10.

To implement the harness 10, wire pairs 20 and 22, having cut and stripped connective conductor pairs 70 and 72, are drawn from various electrical components of the subject system (i.e. automobile, watercraft, etc.) into the open harness 10. The conductors that are to be interconnected are grouped together and capped in a conventional manner using conventional wire caps 66 and 68. The wire caps 66 and 68 are of a size small enough to fit within the portions of the channels 62 and 64 above the platforms 78 and 80 but not so narrow that they can fit within the portions of the channels 62 and 64 below the platforms 78 and 80. The shielded segments of the wire pairs 20 and 22 are then pressed into the channels 62 and 64 with the wire pairs 20 and 22 extending from the bottoms of the channels 62 and 64 toward the tops of the channels 62 and 64. The conductor pairs 70 and 72 and their respective wire caps 66 and 68 protrude above the upwardly facing platforms 78 and 80 with the wire caps 66 and 68 seated on their respective upward facing platforms 78 and 80. The harness 10 is then closed and latched via hinge 84 and latch 86, creating a seal at the lid-base juncture 16.

Under normal operating conditions, the harness 10 will remain watertight while closed. However, circumstances may arise in which water is allowed to enter the harness 10, e.g. the harness may be damaged, or the seal at the lid-base juncture 16 may be compromised, resulting in leakage. In such a situation, the above described double air trap configuration of the present invention will prevent the incoming water from contacting the conductor pairs 70 and 72 inside the wire caps 66 and 68, thereby preventing electrical fault conditions that could disrupt or damage the operation or components of the subject system.

Many alternatives to the fingers 28 and 30 exist and are contemplated by the invention. Any means for securely holding vertically oriented wire caps within the upper chamber 48 will suffice, including arms or clamps protruding from the ceiling 38 or from the sidewalls 40, 42, 44, and 46, or an adhesive holding the wire caps to the ceiling 38 or to the sidewalls 40, 42, 44, and 46.

While certain preferred embodiments of the present invention have been disclosed in detail, it is to be understood that various modifications may be adopted without departing from the spirit of the invention or scope of the following claims.

The invention claimed is:

1. A harness for preventing water from contacting electrical wires, the harness comprising:
(a) a base;
(b) a lid for fitting over the base to form an air chamber within the lid; and
(c) at least one finger extending into the air chamber, said at least one finger having a channel for holding at least one vertically oriented wire cap in which at least two interconnected electrical wires are disposed, a lower edge of said at least one wire cap below a rim of the lid, thereby creating two air traps inside the harness, one within the air chamber and one within said at least one wire cap.

2. The harness in accordance with claim 1, wherein said at least one finger has a shelf protruding into the channel from an inner wall, providing a platform for the lower edge of a wire cap to seat against for securing the wire cap against downward movement.

3. The harness in accordance with claim 2, wherein at least one flange extends from an inner surface of the lid, the flange engaging said at least one wire cap for securing the wire cap against vertical and horizontal movement when the lid is fitted over the base.

4. The harness in accordance with claim 1, wherein the lid and the base are fastened together by at least one hinge and one clasp.

5. The harness in accordance with claim 4, wherein at least one flange extends from an inner surface of the lid, the flange engaging said at least one wire cap for securing the wire cap against vertical and horizontal movement when the lid is fitted over the base.

6. A harness for preventing water from contacting electrical wires, the harness comprising:
 (a) a base;
 (b) a lid for fitting over the base to form an air chamber within the lid and the base; and
 (c) means for mounting within the air chamber at least one vertically oriented wire cap in which at least two interconnected electrical wires are disposed, with a lower edge of said at least one wire cap below a rim of the lid, thereby creating two separate air traps inside the harness, one within the lid and one within said at least one wire cap.

7. A harness in accordance with claim 6, wherein the lid and the base are fastened together by at least one hinge and one clasp for convenient and secure opening and closing of the harness.

8. A harness in accordance with claim 7, wherein at least one flange extends from an inner surface of the lid, the flange engaging said at least one wire cap for securing the wire cap against vertical and horizontal movement when the lid is fitted over the base.

9. A harness in accordance with claim 6, wherein at least one flange extends from an inner surface of the lid, the flange engaging said at least one wire cap for securing the wire cap against vertical and horizontal movement when the lid is fitted over the base.

* * * * *